United States Patent [19]
Warren et al.

[11] Patent Number: 5,617,099
[45] Date of Patent: Apr. 1, 1997

[54] ADAPTIVE FILTERING OF MATCHED-FILTER DATA

[75] Inventors: Ronald W. Warren, Downey, Calif.;
Ben R. Breed, Austin, Tex.

[73] Assignee: Hughes Aircraft Company, Los Angeles, Calif.

[21] Appl. No.: 589,806

[22] Filed: Jan. 22, 1996

[51] Int. Cl.$^6$ ........................................ G01S 13/53
[52] U.S. Cl. ........................ 342/159; 342/162; 342/189
[58] Field of Search ................................ 342/159, 162, 342/189, 195, 203

[56] References Cited

U.S. PATENT DOCUMENTS

| | | | |
|---|---|---|---|
| 3,808,594 | 4/1974 | Cook et al. | 342/201 |
| 4,006,351 | 2/1977 | Constant | 364/724.11 |
| 4,024,541 | 5/1977 | Albanese et al. | 342/189 |
| 4,028,697 | 6/1977 | Albanese et al. | 342/159 |
| 4,635,061 | 1/1987 | Lepere et al. | 342/195 |
| 4,914,441 | 4/1990 | Brookner | 342/161 |
| 5,151,702 | 9/1992 | Urkowitz | 342/134 |
| 5,183,706 | 12/1992 | Urkowitz | 342/99 |
| 5,229,775 | 7/1993 | Sakamoto et al. | 342/160 |
| 5,349,567 | 9/1994 | Reed | 367/100 |
| 5,440,311 | 8/1995 | Gallagher et al. | 342/132 |
| 5,539,408 | 7/1996 | Moreira et al. | 342/25 |

*Primary Examiner*—John B. Sotomayor
*Attorney, Agent, or Firm*—G. S. Grunebach; M. W. Sales; W. K. Denson-Low

[57] ABSTRACT

An adaptive processor which uses the successive range and Doppler outputs of a conventional matched-filter to improve the signal-to-noise ratio for non white noise/clutter. The adaptive processor minimizes the output for a given range and Doppler cell with the constraint that the response to signals returning with specified range and Doppler offsets, with respect to the center of the range-Doppler cell, each have specified values. Weights are derived which can be applied to range-Doppler outputs in the neighborhood of the range-Doppler cell to minimize its output subject to the constraints. The weights depend on an estimate of the cross-covariance matrix of the various outputs of the range-Doppler cells that are to be weighted. The constraint parameters are specified in terms of the ambiguity function of the transmitted waveform. Synthetically generated covariance matrices or combinations of measured and synthetic matrices can also be used to produce desired modifications to the resulting range-Doppler response of the adapted process.

17 Claims, 6 Drawing Sheets

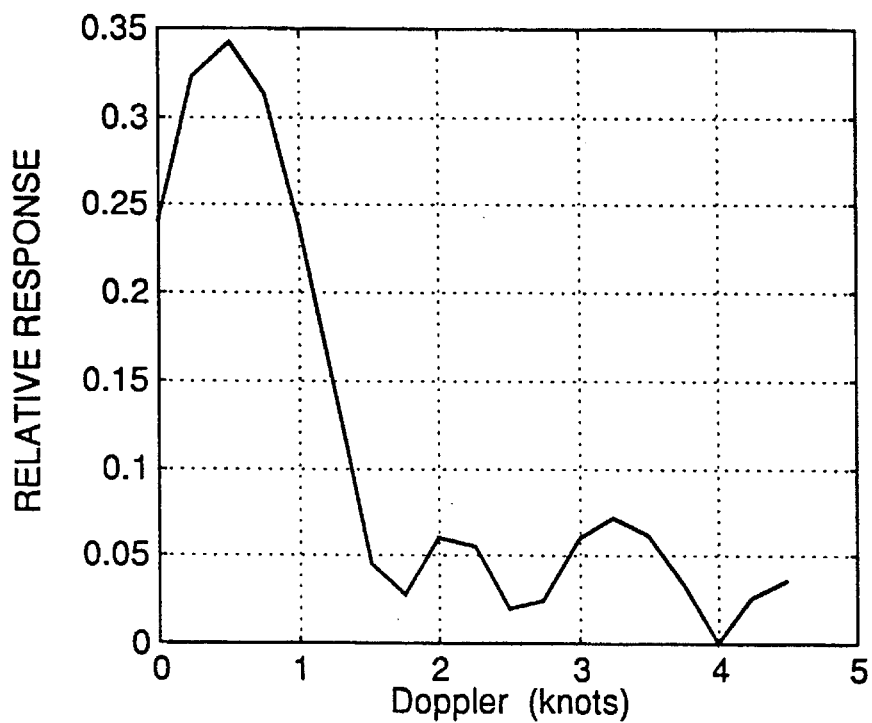
FIG. 2a.
FIG. 2b.
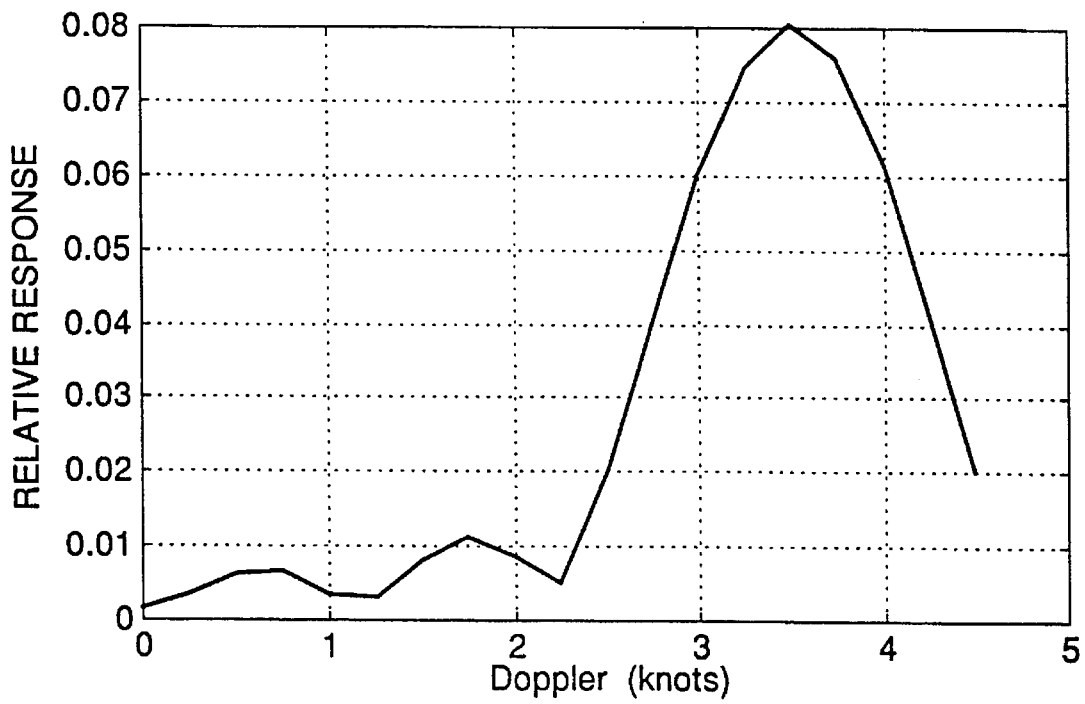

ADAPTIVE FILTERING OF MATCHED-FILTER DATA

TECHNICAL FIELD OF THE INVENTION

This invention relates to radar and sonar systems, and more particularly to a processor which uses the successive range and Doppler outputs of a conventional matched-filter to improve the signal-to-noise ratio (SNR) for non-white noise and/or clutter.

BACKGROUND OF THE INVENTION

In radar and active sonar processing the Doppler compressed versions of the transmitted waveform are used as candidate replicas for replica correlation at the receiver. The received signal is convolved with various replicas. The replicas are time compressed (or time dilated) to account for possible Doppler compressions (or dilations) in the signal. A target's relative Doppler is estimated by the Doppler and range-lag of the replica which correlates best with the target's echo. This Doppler compressed replica-correlation process is known as matched-filtering. It is well known that this process produces peak outputs having a maximum signal-to-noise ratio (SNR) in the case of white additive noise. It is also known that in the case of colored noise the process with maximum SNR is that which first whitens the noise then match filters to the whitened version of the waveform. In the general radar and sonar situations, the spectrum of the noise is not known, and is in fact, highly variable. Conventional radar and sonar coherent processors' matched-filters are designed under the white noise assumption.

The detection of low-Doppler targets in the neighborhood of clutter is generally performed using MTI filters which attempt to filter the zero-Doppler clutter. A problem is knowing exactly where zero-Doppler is. Also, fixed MTI filters cannot respond to changing environments, and adaptive MTI filters are generally of a fixed structure applicable to zero-Doppler clutter response only, and not applicable to the general range-Doppler situation (i.e., to any range-Doppler cell in the range-Doppler plane).

SUMMARY OF THE INVENTION

One aspect of this invention is a processor which uses the successive range and Doppler outputs of a conventional matched-filter to improve the SNR for non-white noise and/or clutter. The adaptive processor is particularly well suited for cluttered situations where the noise/clutter is far from white such as for Doppler estimates in the region of the zero-Doppler ridge. Because the processor is adaptive, it outperforms fixed moving-target-indicator (MTI) filters in variable clutter situations.

The adaptive filtering is designed to minimize the output from a given range and Doppler cell with the constraint that the response to signals returning with specified range and Doppler offsets, with respect to the center of the range-Doppler cell, each have specified values. Weights are derived which are applied to range-Doppler outputs in the neighborhood of the range-Doppler cell to minimize its output subject to the constraints. The constraint parameters are specified in terms of the ambiguity function of the transmitted waveform. The weights which are applied depend on an estimate of the cross-covariance matrix of the various outputs of the range-Doppler cells that are to be weighted.

BRIEF DESCRIPTION OF THE DRAWING

These and other features and advantages of the present invention will become more apparent from the following detailed description of an exemplary embodiment thereof, as illustrated in the accompanying drawings, in which:

FIGS. 2a and 2b show the relative responses of nineteen exemplary Doppler cells to two exemplary signal and clutter situations.

DETAILED DESCRIPTION OF THE PREFERRED EMBODIMENT

Figure 1:
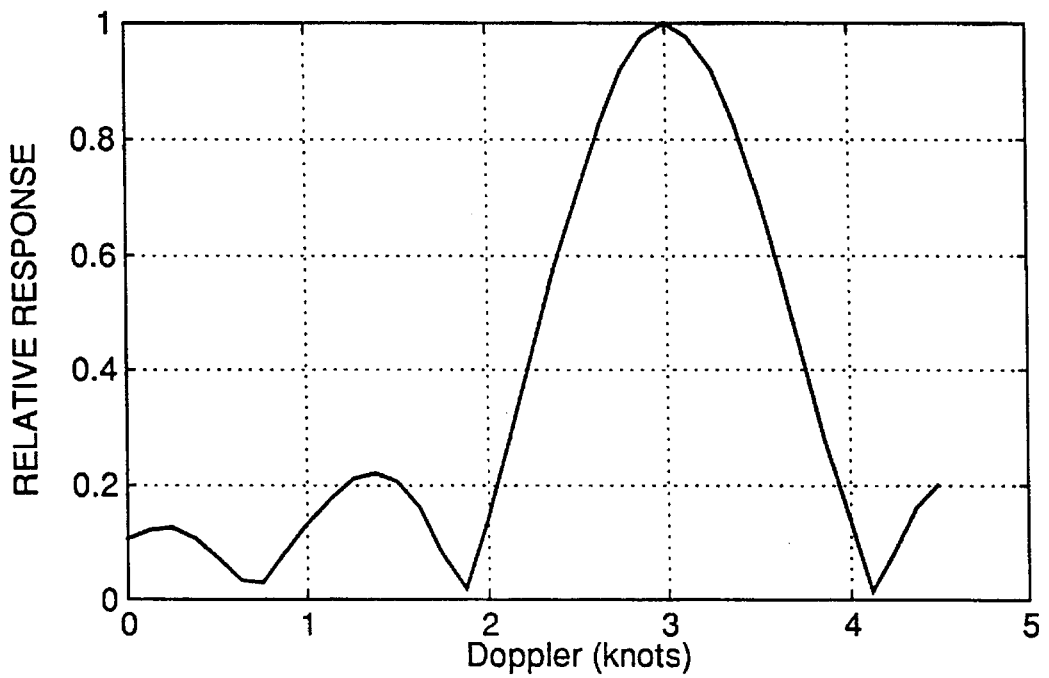
FIG. 1 is a graph showing an exemplary Doppler cell response, centered around 3 knots, calculated at the center of the center range cell in the ambiguity function for a 160 Hz CW waveform.

In accordance with one aspect of this invention, an adaptive process is used to estimate the noise-or-clutter range-Doppler cross-correlation matrix, and its inverse is used to linearly combine the conventional matched-filter outputs in a way that approximates an optimum matched filter (in the minimum-variance distortionless-response (MVDR) sense).

Adaptive Doppler Filtering

The method of using the Doppler-to-Doppler complex filter responses and their measured cross-correlations will be called "adaptive Doppler filtering." It is analogous to adaptive beamforming (ABF) in beam-space, in which ABF is performed on the data at the output of a conventional beamformer by estimating and inverting the noise cross-correlation matrix between the conventional beams. The optimum spatial filter in the sense of maximum SNR is a matched filter which multiples the steering vector by the inverse of the cross-correlation matrix. The inverse correlation matrix performs the function of whitening the noise wave-number spectrum and spatially whitening the replica (the steering-vector). The MVDR spatial processor minimizes the power in a given steering direction subject to the linear constraints that the processor not distort the response in certain steering directions. The directions for which the response is not distorted are called the constraint directions. When the number of constraint directions is greater than one, the MVDR processor is sometimes called the linear-constrained minimum-variance processor.

For the case of the general matched-filter operating in the time and frequency domains, as opposed to the beam-former's space and wave-number domains, the concept is that the conventional Doppler filter complex responses perform the same role as the conventional beampatterns and the role of the beam-to-beam correlation matrix is played by the Doppler-to-Doppler correlation matrix. By appropriate combinations of the Doppler filter outputs, based on the inverse of the correlation matrix, the optimum Doppler matched-filter can be approximated in the case of colored noise. This is done in such a way as to produce the MVDR matched-filter. For the MVDR optimum processor, linear combinations of the conventional matched-filter outputs are used, which minimize the output power at a specified Doppler cell with the constraint that it produce desired matched-filter responses at specified Doppler locations.

Adaptive Processing in Ambiguity Function-Space

Just as ABF using a conventional beamformer's outputs is called ABF in beam-space, the adaptive processing of this invention can be described as adaptive processing in ambiguity-function-space. This is because it uses the complex ambiguity function and the cross-correlation matrix measured from various range-Doppler locations in the matched-filter's outputs. A matched filter's response to a point scatterer is, of course, how the ambiguity function is defined. The processing concept here is only a generalization of the adaptive Doppler filter to include more of the information available in both the Doppler and the range dimensions. The extreme example of this would be the use of the range-response functions and range-cell-to-range-cell cross-correlations to perform optimum filtering in the range dimension. In a basic sense, more general than just Doppler filtering, optimum filtering can be performed simultaneously in both dimensions. Adaptive filtering permits, as an example, reduction of the leakage of the strong clutter returns from the zero-Doppler ridge into adjacent Doppler cells. The fact that it is an adaptive process even allows the location of the zero-Doppler ridge to be unknown (because of inadequate own-Doppler nullification (ODN).

For the MVDR optimum processor, linear combinations of the conventional matched-filter outputs are used which minimize the output power at a specified range-Doppler cell with the constraint that it not modify the normal matched-filter response at specified range-Doppler locations.

Conventional Range and Doppler Responses (Ambiguity Functions) and Optimum Range and Doppler Responses The general ambiguity function in which Doppler shifts are time compressions rather than frequency-shifts (as they are usually approximated to be for lower time-bandwidth (BT) product waveforms for a given waveform $s(t)$), is the response of the conventional matched-filter to that waveform at zero-Doppler and zero-range. It can be expressed, among other possibly more symmetric forms, as $$X(\alpha,\tau) = \int S(t) S^*(\alpha t + \tau) dt \quad (1)$$

where $\alpha$ is the compression factor, $\tau$ is the range delay and $t$ is the time. In this form it is the correlation of the waveform at zero lag and zero Doppler with a delayed and compressed version of itself. This form for the ambiguity function is convenient since the matched-filters will also correlate the received signals with a delayed and compressed version of the transmitted waveform. In discrete time, this equation can be written $$X(\alpha_k, p) \equiv \sum_n s(n) s^*(\alpha_k n + p) \quad (2)$$

The symbol $n$ refers to the time $n/f_s$ and $\alpha_k n$ refers to $\alpha_k n/f_s$ where $f_s$ is the sampling frequency. Thus, the second function in this expression can be thought of as the function $s(t)$ compressed and then sampled at $f_s$ or as the function $s(t)$ sampled at $f_s/\alpha_k$. The received signal at time n is denoted by $x(n)$ and the output of the conventional matched-filter with time compression factor $\alpha_k$ at range-lag p by $y_k(p)$. The matched-filter outputs can be expressed as $$y_k(p) \equiv \sum_{n=1}^{N} x(n) s^*(\alpha_k n + p), \quad (3)$$

$$p = 1 \ldots ; k = 1, \ldots, K$$

where N is large enough to include all of the non-zero values of the replica, and K is the number of discrete Doppler cells. These equations can be written in matrix notation as $$Y_k = S_k X^+ \quad (4)$$

for any P-length output data vector, N-length input vector X, and P×N matrix $$S_{k,mn}^+ = S^*(\alpha_k n + m) \quad (5)$$

where + indicates conjugate transpose and * represent complex conjugation. There is a separate output for each discrete Doppler. The cross-correlation matrix across the various Doppler filters, in the case of noise and clutter is denoted by R. The problem for the adaptive range-Doppler filter can be stated as $$\min W^T R W \text{ subject to } W^T M = b^T \quad (6)$$

where a weight vector W linearly combining the range-Doppler cell outputs is found such that the output power is minimized in the case of noise and clutter, subject to the requirement that the weighted sum is to have the values $b^T$ when the Doppler cells' outputs are given by M. The columns of M specify the range-Doppler responses on each of the range-Doppler cells corresponding to discrete Doppler inputs for the values specified by the vector $b^T$. The result is that if there is a strong interference coming in at a different range and Doppler, its influence is removed from the cell in question, because it is not at one of the range-Doppler values being constrained and the output power will be minimized by reducing its contribution to the output. The essential idea is that the outputs of the MVDR'd cells are caused only by range and Doppler inputs at the specified Doppler compressions and range-delays, and are not caused by leakage from adjacent range-Doppler cells.

As an example, FIG. 1 shows the response of a Doppler cell, calculated at the center of the range cell in the ambiguity function, centered around three knots for a 160 Hz, CW waveform. Because the waveform used in this example is unshaded (i.e., the amplitude of the waveform is not tapered at the ends), the expected −14 dB sidelobes are visible. With shading (tapering the waveform at the ends), these sidelobes can be reduced with the consequence that the mainlobe width increases. At eight seconds duration, the CW waveform Doppler resolution is about 0.125 Hz, which translates to about a 1.15 knot Doppler resolution capability. It is seen that if clutter was present at 0.5 knots and 20 dB larger than a signal, it would produce a response in this Doppler cell as large as the signal at 3 knots and would begin to mask it. Also, if a second target (5 dB above the signal) were present at 3.75 knots, it would be hard to resolve from the signal at 3 knots.

FIGS. 2a and 2b show the relative responses of nineteen Doppler cells, representing 0 to 4.5 knots, to these two signal and clutter situations. It is seen in FIG. 2a that the 20 dB clutter at 0.5 knots (the large peak) has completely swamped the signal at 3 knots. The signal cannot be distinguished from the sidelobe of the large clutter. This is a typical situation when one is resolving low Doppler targets in the presence of zero-Doppler clutter, especially since source and receiver motion make it certain which Doppler cell represents zero Doppler clutter. In FIG. 2b, it can be seen that the two signals at 3 and 3.75 knots cannot be resolved; they look like a single target located at about 3.75 knots.

The objective of the adaptive processing in accordance with the invention is to prevent signals (or interference), from other than the immediate range-Doppler-neighborhood of the range-Doppler cell's center values from influencing the cell's output. At the adaptive processor output, the only outputs of the individual range-Doppler cells should be caused by signals at those values and not be caused by leakage from strong signals at other ranges and Doppler compressions. At the same time it is necessary to keep the processing from suppressing signals which are just a small amount away from the Doppler and range cells' centers. This is done by constraining the outputs to have close to their conventional values at several points close to the Doppler and range cells' centers. This is the case of using multiple constraints in the MVDR processing.

Processor Description

Figure 3:
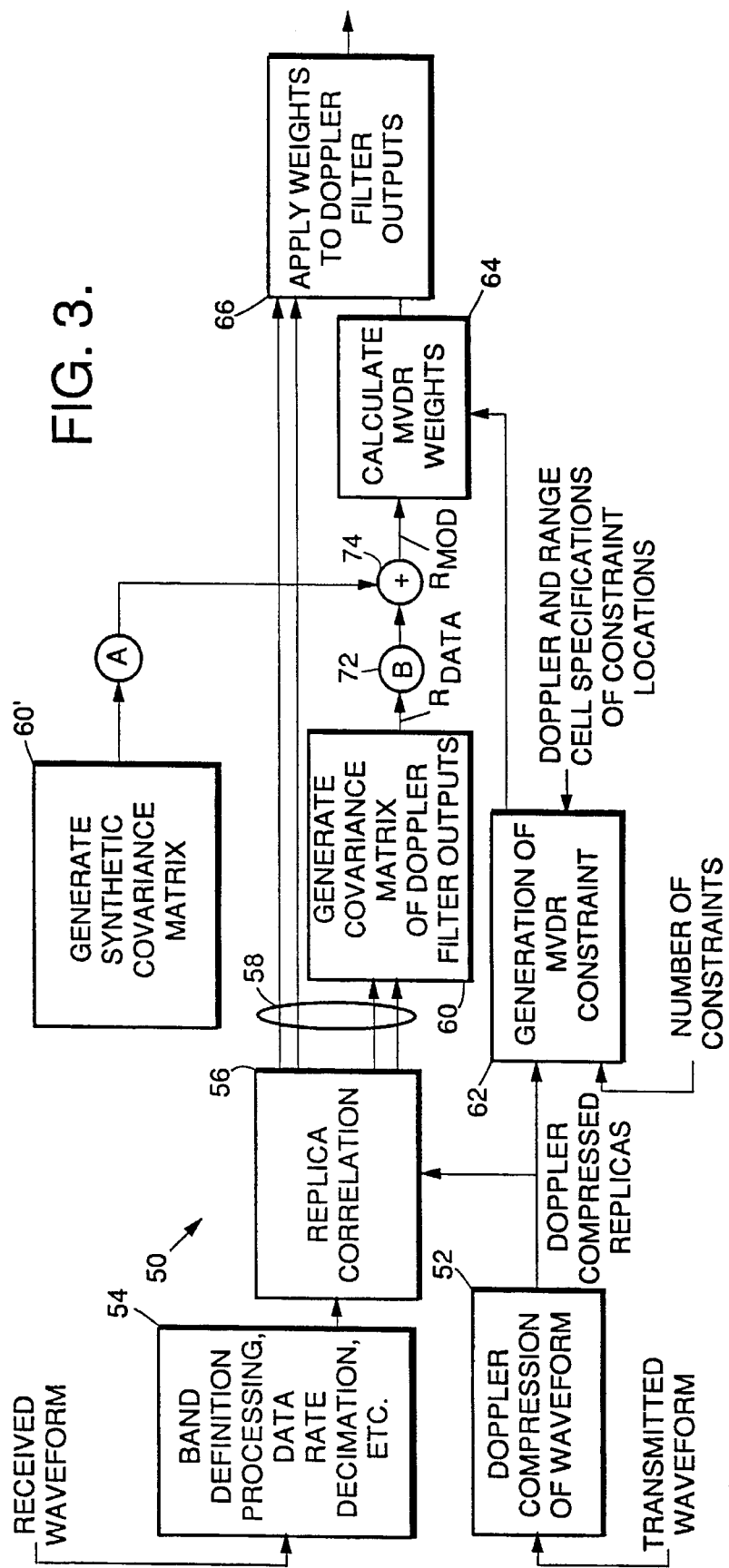
FIG. 3 shows a functional block diagram of an adaptive ambiguity-space (Matched Filter Output) processor in accordance with the invention.

An adaptive ambiguity-space (Matched Filter Output) processor 50 in accordance with the invention is shown in functional form in FIG. 3. The matched-filter is implemented using replica correlation with Doppler compressed versions of the transmitted waveform as the replicas. This is where conventional matched-filtering stops. The adaptive process, in accordance with the invention, uses these matched-filter outputs, applies a weighting across various Doppler filter outputs, and possibly across range cells as well, to produce outputs with the desirable features described above. To do this the weights are selected to minimize the outputs of each range-Doppler cell under the constraint that signals arriving at locations near the range-Doppler cells' centers are not disturbed. In this context, signal locations are "near" the range-Doppler cell center which are within the Doppler resolution of the transmitted signal waveform. For the exemplary waveform described with respect to FIG. 2, a constraint location for the 4 knot filter would be within 4 knots plus or minus 1.15 knots, since the CW waveform Doppler resolution is about 0.125 Hz, which translates to about a 1.15 knot Doppler resolution.

Thus, as shown in FIG. 3, the transmitted waveform is subjected to Doppler compression 52 in the conventional manner to produce Doppler compressed replicas of the transmitted waveform. The received waveform is subjected to conventional preliminary processing 54 such as band definition processing and data rate decimation, before being passed through the conventional replica correlation 56 to produce the Doppler filter outputs 58.

The covariance matrix is generated at 60 from the Doppler cells' outputs over time, ideally when only noise or clutter is present. The covariance matrix is defined to be the expected value of the dyadic product of the Doppler outputs $$R = E[(y_1(p_1) \ldots y_k(p_1), \ldots, y_1(p_N) \ldots y_k(p_N))^T (y_1(p_1) \ldots y_k(p_1), \ldots y_1(p_N) \ldots y_k(p_N))] \quad (7)$$

using the notation of equations 1–6, where multiple values of p ($p_1 \ldots p_N$) indicate multiple range cells may be used. In the adaptive processor 50, the expected value of the dyadic product is estimated by a time average.

The MVDR constraints are generated at 62, and are used in the calculation of the MVDR weights. The function 62 operates on the Doppler compressed replicas, using the number of constraints and the Doppler and range cell specifications of the constraint locations, to produce the MVDR constraints.

The next step in generating the MVDR weights, indicated as 64, is to calculate the constraint parameters M and b as defined in equation 6. The rows of the matrix M are the Doppler cells to which the weights are to be applied. The best performance w[11 be achieved when weighting is applied over all the cells. However, this is also the most processor intensive operation, and so the designer may elect to use only a sub-set of cell weighting to reduce the processor loading while accepting some reduction in performance. The degradation does not increase rapidly with the reduction in the number of cells. Thus, for example, if one is applying the process to cell 13, the cells selected for weighting may be all Doppler cells, or a subset of all of the Doppler cells such as cells 10 through 16. It may also include more than one range cell as well as these multiple Doppler cells. The columns of M refer to the constrained range-Doppler values. If there is only one constraint, it is usually applied at the center of the range-Doppler cell. In the processing examples shown below, three constraints are applied all at the range center but on either side in Doppler. In general, the constraints can be applied at any point on the ambiguity surface of the transmitted waveform.

Let the set of range-Doppler cells to be weighted be denoted by j and be $J_N$ in number, and let the set of constraints be located at the range and Doppler values ($\tau_i$, $\alpha_i$) where i ranges from one to the number of constraints, $N_c$. The constraint matrix M is $J_N \times N_c$ and its (j, i) element is given by $$M_{ji} = \sum_{n=1}^{N} s(\alpha_i n + \tau_i) s^*(\alpha_j n); \quad (8)$$

$$j \in J, \, i = 1, \ldots, N_c$$

which is to say, it is the amplitude response of the jth Doppler bin to a signal arriving with Doppler compression $\alpha_i$ and range-off-range-cell-center given by $\tau_i$. The notation is used that the particular range-Doppler cell being processed is the primary cell. The other cells being weighted along with the primary cell are called reference cells. Then the vector b from equation 6 can be given by $$b_i = \sum_{n=1}^{N} s(\alpha_i n + \tau_i) s^*(\alpha_{pri} n); \quad (9)$$

$$j_{pri} \in J, \, i = 1, \ldots, N_c,$$

where $\alpha_{pri}$ is the Doppler compression factor corresponding to the primary cell to be processed. This is just one example of the way b, the desired amplitude response at the constrained points, may be selected. An example to be shown below is computed for three constraints with the two constraint values off cell-center being given by this formula multiplied by 0.95 to slightly sharpen the desired peak response. Given the constraint parameters M and b, the weights may be calculated by the known MVDR formula $$W^T = b^T (M^T R^{-1} M)^{-1} M^T R^{-1} \quad (10)$$

The weights are then applied, function 66, to the Doppler filter outputs to provide the final processor outputs. The final outputs for the primary cell are given by the matched-filter outputs $y_k(p)$ of equation 3 as $$z(p) = \sum_{k \in j} W_k y_k(p) \quad (11)$$

There is one output for each primary cell processed for each sample time, p. The process is adaptive because the weights depend on the covariance matrix R which is calculated from the data. All other parameters on which the weight depends may be calculated beforehand, and are based on the waveform to be transmitted.

There are various known methods for estimating the covariance matrix and its inverse, including Cholesky factor calculation with rank-one updating, and each of these methods is applicable here.

Processing Examples

Figure 4A:
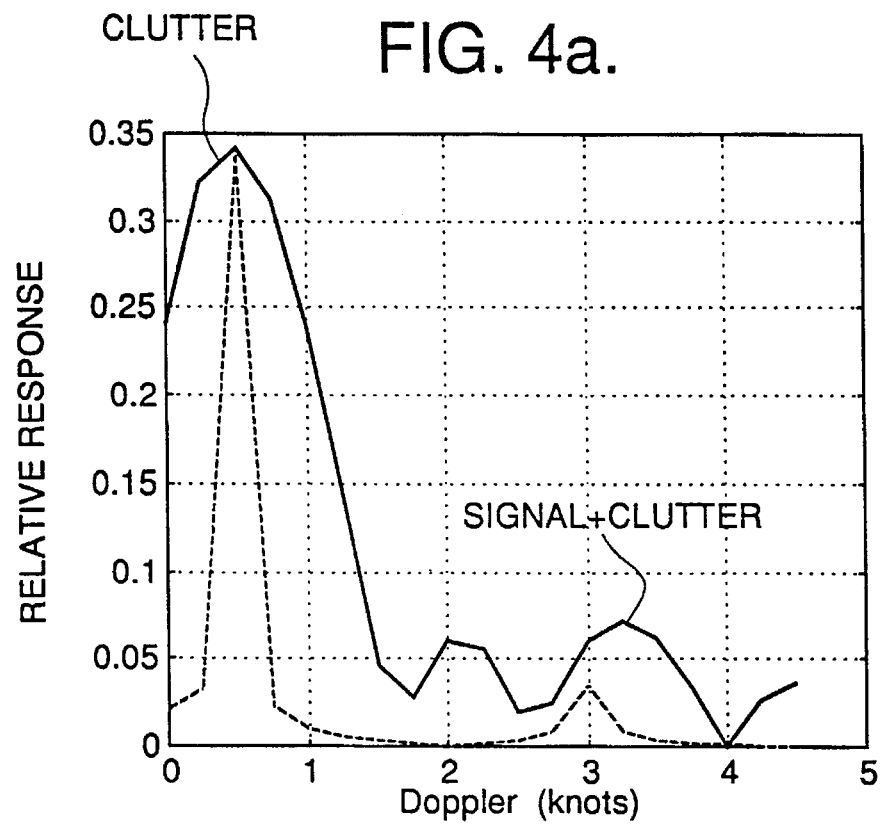
FIGS. 4a and 4b shows the same examples as were shown in FIGS. 2a and 2b except that, as the dotted curves, the responses of exemplary adaptive filter outputs in accordance with the invention are included.
Figure 4B:
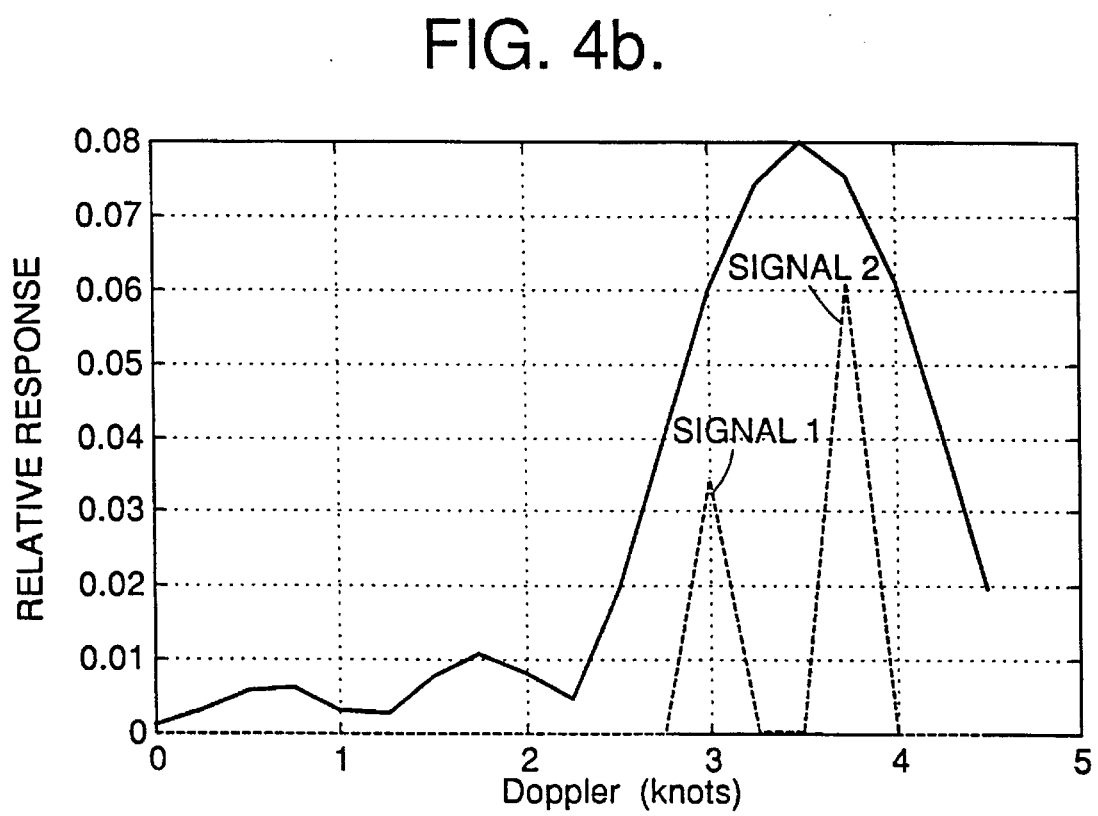

In this section several processing examples are presented using the algorithm for adaptive processing at matched filter outputs. In FIGS. 4a and 4b the same examples are shown as were shown earlier in FIG. 2a and 2b except that, as the dotted curves, the responses of the adaptive filter outputs (assuming known covariance matrix for simplicity) are included. In the case where the strong near-zero knot clutter completely swamped the signal at 3 knots, it can be seen that, after the processing, the signal is visible, and for the case where two signals were not resolvable using conventional processing, they become resolvable using the adaptive processing described herein. In fact, the relative levels of the signals are preserved in both FIGS. 4a and 4b.

Figure 5A:
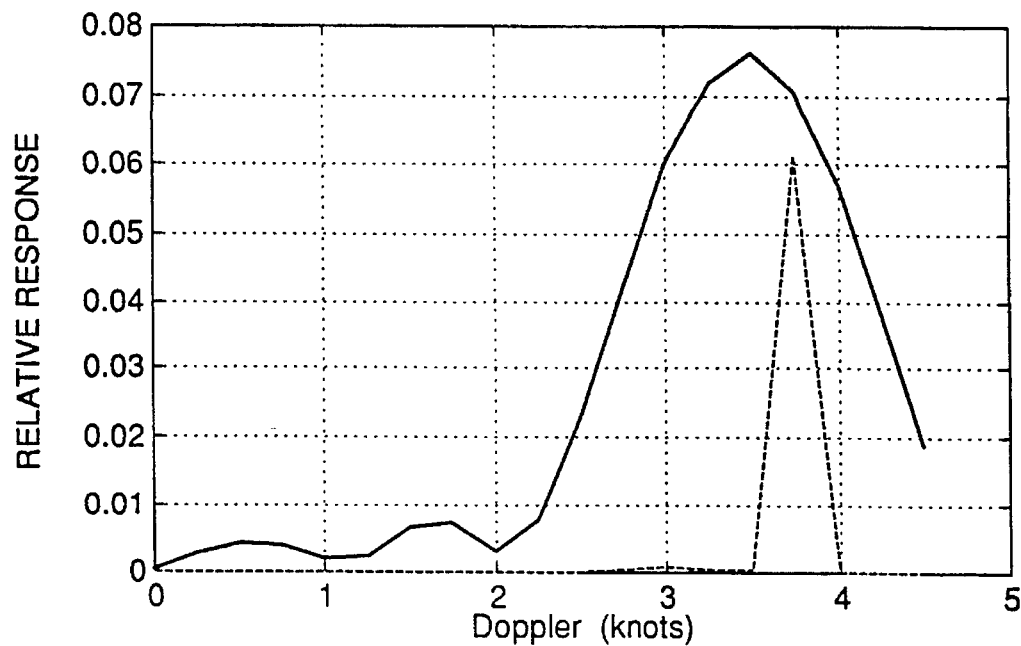
FIGS. 5a and 5b illustrate the Doppler cell amplitude responses with the signal located between the centers of two Doppler cells, with one constraint used in the example of FIG. 5a and three constraints used in the example of FIG. 5b.
Figure 5B:
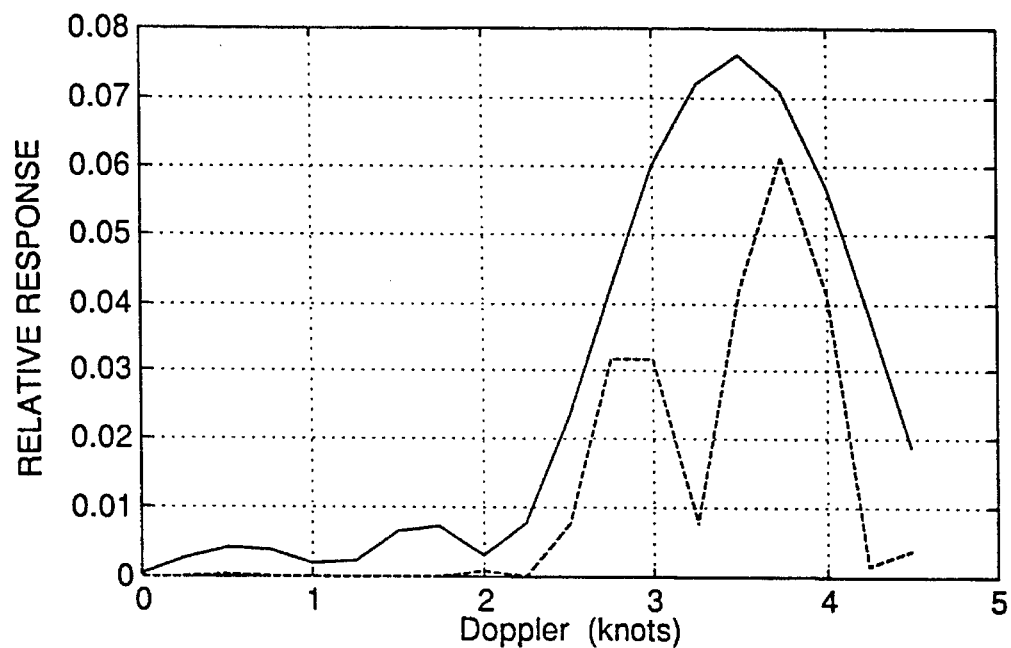

FIGS. 5a and 5b shows the necessity for multiple constraints in general. In FIG. 5a, a single constraint is used, and the signal was moved to 2.875 knots and is barely visible after adaptive processing because it was selected to not be on the Doppler cell center. Because of the increased resolution or, the output and the constraint being applied only at 3 knots the signal at 2.875 knots is suppressed.

FIG. 5b shows the Doppler cell responses with the signal located between the centers of two Doppler cells, and using three constraints. FIG. 5b shows that if one uses multiple constraints (in this case three) the signal suppression can be eliminated. Note that since the signal was between two cells it appears with equal magnitude on each of them.

Figure 6A:
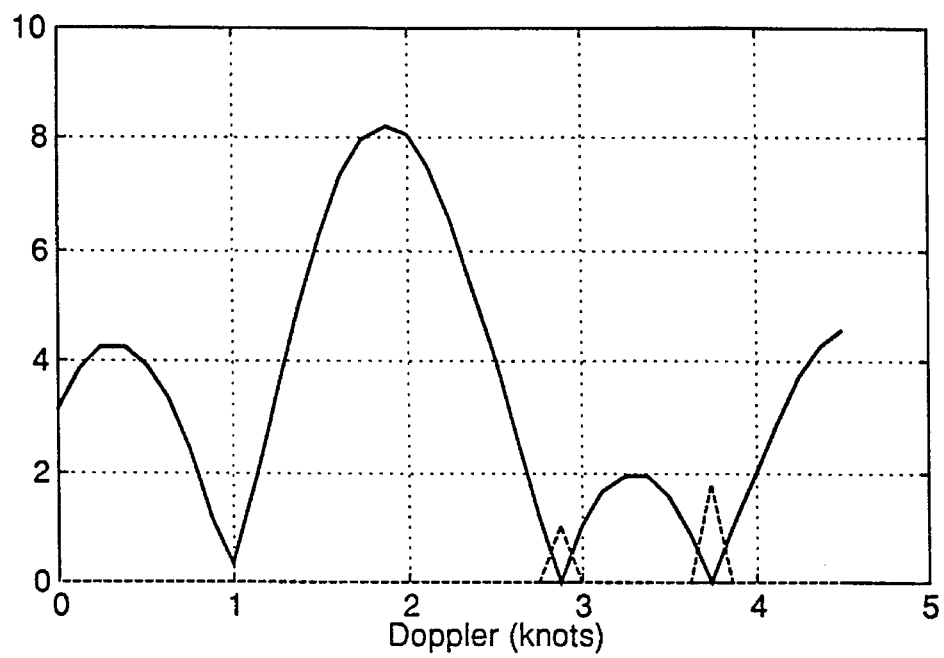
FIGS. 6a and 6b show the amplitude response of the Doppler cell centered at 3 knots for both of the situations shown in FIGS. 5a and 5b.
Figure 6B:
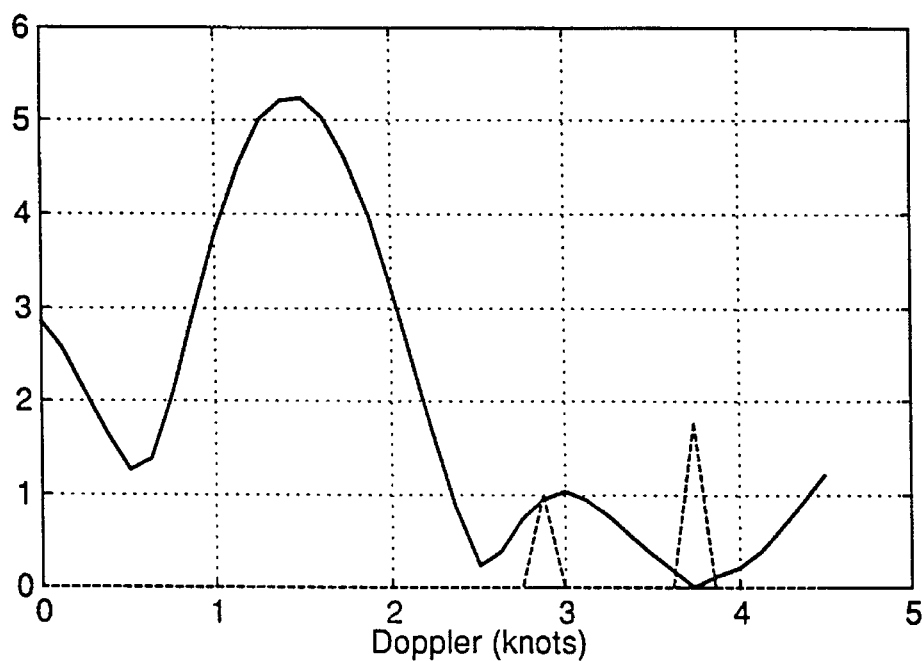

FIGS. 6a and 6b show the amplitude response of the Doppler cell centered at 3 knots for both of the situations shown in FIGS. 5a and 5b. In FIG. 5a the response is zero at both at 3.75 and at 2.875 knots, where the signal we wish to show up in the 3 knot cell is. FIG. 5b shows that the use of the three constraints (one of which is at 2.875) prevents the amplitude response of the 3 knot cell from becoming zero at 2.875.

A similar result holds when a signal is not at the center of a range cell. The use of a constraint offset in the range dimension as in equations 8 and 9 will prevent signal suppression for this case also. This is not demonstrated in the example here because of the lack of range response sensitivity of the 8 second CW waveform chosen for the example.

Figure 7:
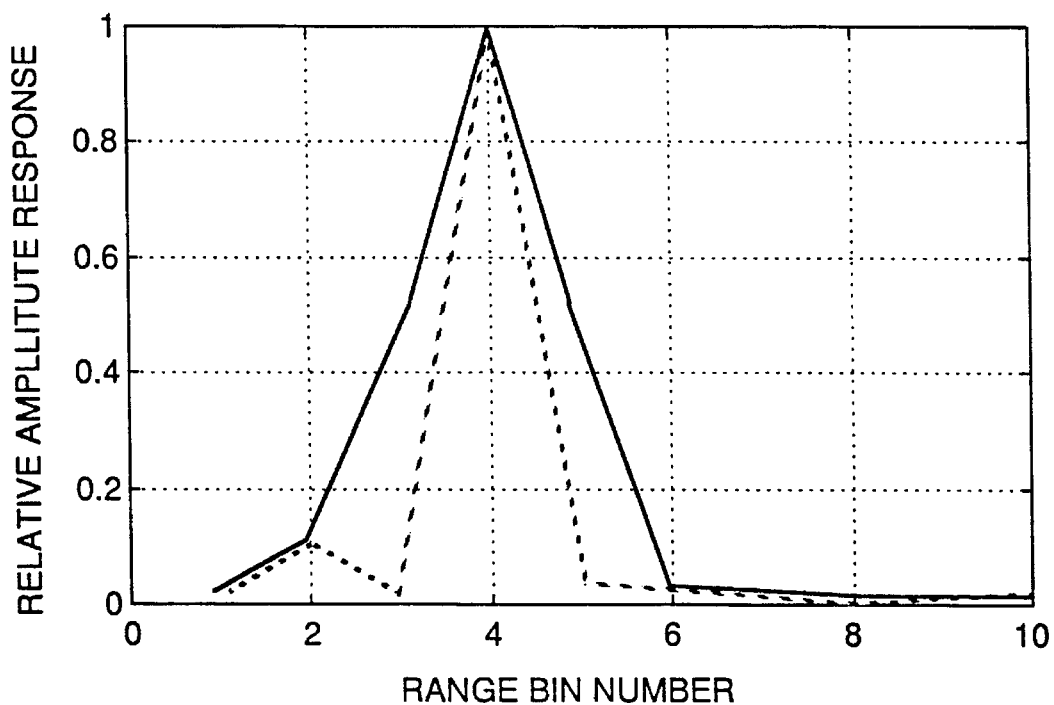
FIG. 7 shows exemplary range cell amplitude responses of both the conventional matched filter processor and the adaptive processor in accordance with the invention.

The application of the processor algorithm in the range dimension as opposed to the Doppler dimension is shown in FIG. 7. The figure shows the conventional matched-filter output as a solid curve and the adapted output resulting from the method in accordance with the invention as the dashed curve. Plotted across the abscissa are ten range bins. The curves represent the outputs of the conventional and adaptive processors in each of these range bins.

The first aspect to be noted regarding FIG. 7 is that the adapted response in accordance with the invention is much narrower than the conventional matched-filter response in that it falls to one-half of its peak value in about one-half range bin rather than the full range bin required for the conventional matched-filter response to fall to one-half of its value. This means that the adapted response has about doubled the range resolution of the conventional processor.

The second aspect to be noted regarding FIG. 7 is the peak at range bin two which is apparent in the adapted response and not in the conventional matched-filter response. This target was placed at this bin with an amplitude 20 dB below the peak at range bin four, representing interference in this case. It is noted that the adaptive process has brought this signal out of the effect of the interference at range bin four. These are the same two advantages shown for the Doppler dimension in FIGS. 4 and 5, except that here they are illustrated for the range dimension.

A processor has been described which applies optimum processing to the outputs of a matched filter. The optimization is based on minimizing the output of a range-Doppler cell subject to linear constraints applied to preserve the response at selected points on the surface of the ambiguity function surface. This processing helps in finding low Doppler signals in the neighborhood of the high clutter return around zero-Doppler, and it has the capability of resolving targets closely spaced in Doppler, i.e., separated by less than the putative Doppler resolution capability of the waveform. Achieving this kind of resolution may sometimes involve undesirable sensitivity to errors, so some diagonal loading (addition of a constant to the diagonal of the covariance matrix) has been included in the foregoing example, which is known to constrain the whitenoise gain of the process and thus stabilize it versus system uncertainties. The presence of this undesirable sensitivity can be seen by the large amplitude responses of the Doppler cell in areas other than where the constraints are applied. It is probably best to expect that pulling small signals out of nearby clutter is to be the most direct application of the process described herein, but increased resolution capability is also to be expected.

Another aspect of the invention is the optional use of a synthetic covariance matrix $R_s$. Suppose, for example, that one wishes to suppress a particular part of the ambiguity surface, and let this be specified by its relative range and Doppler compression t, $\beta$, respectfully, where t represents the time delay and $\beta$ represents the compression. Let the relative ranges and Dopplers of the centers of the cells (to which weights are to be applied) be given $\tau_j$, $\alpha_j$, j=1, ... J. This means that the responses of matched-filters centered at those range-Dopplers will be given by $$y_j = \sum_{n=1}^{N} s(\beta n + t)s^*(\alpha_j n + \tau_j);$$

$$j = 1, \ldots, J.$$

where s is the waveform. A synthetically altered cross-covariance matrix is constructed as follows $$R_{mod} = AR_{data} + B(y^T y)$$

where A and B are constants, $R_{data}$ is the covariance matrix computed from the data, and $R_{mod}$ is the synthetically modified covariance matrix. When B is large relative to A (i.e., B=1, A=0) then the covariance matrix appears to be due to interference concentrated at t, $\beta$ and the adaptive processor will use this modified matrix to calculate weights suppressing the response in that region, subject to the constraints. When the opposite is the case, the normal adaptive filter response results. The weights using the modified covariance need only be applied to the desired regions of the range-Doppler plane. Because the response cannot be arbitrarily modified, it is suggested that the design be iterated. The ambiguity surface produced by the process is the weighted sum of the individual ambiguity functions appropriately shifted in range and Doppler. This response can be calculated and recalculated by modifying such parameters as range-Doppler cell selections and t, $\beta$ until a desired response is achieved. A procedure similar to this has been used to design desirable beam responses at a conventional beamformer's output.

Function block 60', multipliers 70 and 72, and mixer 74 in FIG. 3 illustrates the optional mixing of the synthetic covariance matrix $R_s$ with the data-dependent covariance matrix $R_{data}$ calculated by function 60 from the data to provide the synthetically modified covariance matrix $R_{mod}$.

It is understood that the above-described embodiments are merely illustrative of the possible specific embodiments which may represent principles of the present invention.

Other arrangements may readily be devised in accordance with these principles by those skilled in the art without departing from the scope and spirit of the invention.

What is claimed is:

1. A method for adaptively processing return signals from a transmitted waveform in the presence of non-white noise or clutter return, comprising the following steps:

forming a plurality of Doppler compressed replicas of the transmitted waveform;

performing correlation of a version of the received waveform with the Doppler compressed replicas to provide matched filtering of the version of the received waveform and produce a plurality of range-Doppler filter outputs;

generating a covariance matrix from the range-Doppler filter outputs over time;

determining a set of weights in dependence on the covariance matrix;

applying the weights to selected ones of the range-Doppler filter outputs to produce the processor output signal.

2. The method of claim 1 wherein the step of generating the covariance matrix is carried out when only noise or clutter is present and in the absence of return signals.

3. The method of claim 1 wherein the weights are determined so as to minimize the outputs of each range-Doppler filter under the constraint that signals arriving at constraint locations are not attenuated by the processing.

4. The method of claim 3 wherein the covariance matrix is further dependent on the specification of Doppler and range filter constraint locations and on the number of constraint locations.

5. The method of claim 3 wherein there is a single constraint location within a range-Doppler filter, the single constraint located at the center of the range-Doppler filter.

6. The method of claim 3 wherein there are a plurality of constraint locations located within a range-Doppler filter, the transmitted waveform is characterized by an inherent Doppler resolution, and wherein the constraint locations are near the :enter of the range-Doppler filter, such that any offset from the filter center of the constraint locations does not exceed said inherent Doppler resolution.

7. The method of claim 1 wherein the weights are applied to all range-Doppler cell outputs.

8. A method for adaptively processing return signals from a transmitted waveform in the presence of non-white noise or clutter return, comprising the following steps:

forming a plurality of Doppler compressed replicas of the transmitted waveform;

performing correlation of a version of the received waveform with the Doppler compressed replicas to provide matched filtering of the version of the received waveform and produce a plurality of range-Doppler filter outputs;

generating a data-dependent covariance matrix from the range-Doppler filter outputs;

generating a modified covariance matrix which is a linear combination of the data-dependent covariance matrix and a synthetic covariance matrix;

determining a set of weights in dependence on the modified covariance matrix; and applying the weights to selected ones of the range-Doppler filter outputs to produce the processor output signal.

9. The method of claim 8 wherein the step of generating the estimated covariance matrix is carried out when only noise or clutter is present and in the absence of return signals.

10. The method of claim 8 wherein the weights are determined so as to minimize the outputs of each range-Doppler filter under the constraint that signals arriving at constraint locations are not attenuated by the processing.

11. The method of claim 8 wherein the synthetic covariance matrix is for suppressing a predetermined part of the ambiguity surface specified by its relative range and Doppler compression $t$, $\beta$, respectively, and wherein the modified matrix $R_{mod}$ is determined according to the following relationship $$R_{mod} = AR_{data} + B(y^T y)$$

where A and B are constants, $R_{data}$ is the data-dependent covariance matrix, and $$y_j = \sum_{n=1}^{N} s(\beta n + t) s^*(\alpha_j n + \tau_j);$$

$$j = 1, \ldots, J$$

where s is the transmitted waveform.

12. An adaptive processor for processing return signals from a transmitted waveform in the presence of nonwhite noise or clutter, comprising:

means for forming a plurality of Doppler compressed replicas of the transmitted waveform;

correlator means for performing correlation of a version of the received waveform with the Doppler compressed replicas to provide matched filtering of the version of the received waveform and produce a plurality of range-Doppler cell outputs;

means for providing a covariance matrix from the range-Doppler cell outputs over time;

means for determining a set of weights in dependence on the covariance matrix;

means for applying the weights to selected ones of the range-Doppler filter outputs to produce the processor output signal.

13. The processor of claim 12 wherein the means for providing the estimate of the covariance matrix operates on the outputs of the range-Doppler filter filters when only noise or clutter is present and in the absence of return signals.

14. The processor of claim 12 wherein the weights are determined so as to minimize the outputs of each range-Doppler filter under the constraint that signals arriving at constraint locations are not attenuated by the processing.

15. The processor of claim 14 wherein the covariance matrix is further dependent on the specification of Doppler and range filter constraint locations and on the number of constraint locations.

16. The processor of claim 14 wherein there are a plurality of constraint locations located within a range-Doppler filter, the transmitted waveform is characterized by an inherent Doppler resolution, and wherein the constraint locations are near the center of the range-Doppler filter, such that any offset from the filter center of the constraint locations does not exceed said inherent Doppler resolution.

17. The processor of claim 12 wherein the weights are applied to all range-Doppler filter outputs.

* * * * *

UNITED STATES PATENT AND TRADEMARK OFFICE
CERTIFICATE OF CORRECTION

PATENT NO : 5,617,099
DATED : April 1, 1997
INVENTOR(S) : Ronald W. Warren

It is certified that error appears in the above-identified patent and that said Letters Patent is hereby corrected as shown below:

Column 1, below the title, please insert the following

--This invention was made with Government support under Contract No. N00039-90-C-0003 awarded by the Department of the Navy. The Government has certain rights in this invention.--

Signed and Sealed this

Thirtieth Day of November, 1999

Q. TODD DICKINSON

Attest:

Attesting Officer

Acting Commissioner of Patents and Trademarks